United States Patent [19]

Watanabe et al.

[11] Patent Number: 4,808,557

[45] Date of Patent: Feb. 28, 1989

[54] SINTERED TITANIUM CARBO-NITRIDE CERAMICS

[75] Inventors: Tadahiko Watanabe; Kazuhisa Shobu, both of Saga; Yuko Tsuya; Yuji Enomoto, both of Ibaragi; Junshiro Hayakawa, Fukuoka; Osamu Yagishita, Fukuoka; Hideki Yamamoto, Fukuoka; Eiichi Sudoh, Fukuoka, all of Japan

[73] Assignees: Kyushu Director of Institute, Itaru Todoroki, Saga; Tokyo Kokyu Rozai Co., Ltd., Fukuoka, both of Japan

[21] Appl. No.: 68,740

[22] Filed: Jun. 30, 1987

Related U.S. Application Data

[63] Continuation of Ser. No. 810,466, Dec. 18, 1985, abandoned.

[30] Foreign Application Priority Data

Dec. 24, 1984 [JP] Japan ................. 59-270943
Apr. 16, 1985 [JP] Japan ................. 60-82033

[51] Int. Cl.$^4$ .............................. C04B 35/56
[52] U.S. Cl. ........................ 501/87; 501/93; 501/132; 51/307; 51/309; 75/237; 75/241
[58] Field of Search ............... 501/93, 132, 87; 51/307, 309; 75/237, 241, 240

[56] References Cited

U.S. PATENT DOCUMENTS 4,320,203  3/1982  Brandt et al. ............ 501/87
4,492,764  1/1985  Watanabe et al. ........ 501/87

FOREIGN PATENT DOCUMENTS 3426176    2/1985  Fed. Rep. of Germany ... 501/93
54-34312   3/1979  Japan ..................... 501/87
54-68814   6/1979  Japan ..................... 501/87
57-47845   3/1982  Japan ..................... 75/241
57-47704  10/1982  Japan ..................... 51/307
58-190874 11/1983  Japan ..................... 501/87
59-26977   2/1984  Japan ..................... 501/87

Primary Examiner—Steven Capella
Assistant Examiner—Ann Knab
Attorney, Agent, or Firm—Jordan and Hamburg

[57] ABSTRACT

The present invention is characterized by ceramic materials comprising ceramic sintered bodies consisting of (1) 1–90 wt % chromium carbide and the remainder carbonic titanium nitride; (2) 1–90 wt % chromium carbide, 0.1–5 wt % B$_4$C and the remainder titanium carbo-nitride; or (3) either of the above compositions plus less than 95 wt % of a metal boride such as Ti or Zr. Such ceramic sintered bodies are used for cutting tools or wear-resistant machine parts because of their high density, high hardness and high strength.

26 Claims, No Drawings

SINTERED TITANIUM CARBO-NITRIDE CERAMICS

This application is a continuation of application Ser. No. 810,466, filed Dec. 18, 1985, now abandoned.

BACKGROUND OF THE INVENTION

The present invention relates to titanium carbonitride ceramics having high density, high hardness and high strength, wherein such ceramics are used for materials for cutting tools or wear-resistant machine parts.

Tungsten carbide has been mainly used for cutting tool materials, in spit but since tungsten raw materials have been insufficient in recent years. Therefore, sintered titanium carbo-nitride bodies or titanium diboride bodies have begun to attract attention.

Titanium carbo-nitride exists as a solid solution of TiN and TiC where, the proportion of carbon and nitrogen in the solid solution is easily distributed. It is confirmed by X-ray diffraction that titanium carbo-nitride is a completely different material from titanium carbide and titanium nitride, and the material properties such as hardness and toughness or the sinterability are also different. Titanium carbo-nitride has a high melting point, high hardness, high toughness and oxidation resistance, and is used as material for cutting tools or wear-resistant machine parts. A sintered body of pure titanium carbo-nitride is rarely used for the above-mentioned purposes because the sintered body has low breaking strength and is brittle.

Composite ceramics of metal boride and titanium carbo-nitride have been already developed by the inventors of the present invention, and are already well-known in Japanese Patent Publication No. 59-18349. Therefore, the present invention is a further development.

SUMMARY OF THE INVENTION

It is an object of the present invention to provide sintered ceramics of high density, high hardness and high strength which are used for cutting tool materials or for wear-resistant machine parts.

The above-mentioned object of the present invention can be achieved by the following combinations:

(1) Sintered ceramics consisting of 1–90 wt% of chromium carbide and the remainder titanium carbo-nitride, in which the mole ratio of carbon and nitrogen is 1:9–9:1;

(2) Sintered ceramics as defined in (1) consisting of 0.1–5 wt% of $B_4C$;

(3) Sintered ceramics as defined in (1) above further consising of less than 95 wt% of a metal boride selecting from one or more of $TiB_2$, $CrB_2$, $TaB_2$, $MnB_2$, $MoB_2$, $VB_2$, $NbB_2$, $HfB_2$, $AlB_2$, $ZrB_2$, $TiB$, $CrB$, $TaB$, $MnB$, $MoB$, $VB$, $VB$, $NbB$, $HfB$, $ZrB$, $W_2B_5$ and $Mn_2B_5$; and (4) Sintered ceramics as defined in (2) above further consisting of and less than 95 wt% of a metal boride selecting from one or more of $TiB_2$, $CrB_2$, $TaB_2$, $MnB_2$, $MoB_2$, $VB_2$, $NbB_2$, $HfB_2$, $AlB_2$, $ZrB_2$, $TiB$, $CrB$, $TaB$, $MnB$, $MoB$, $VB$, $NbB$, $HfB$, $ZrB$, $W_2B_5$ and $Mn_2B_5$.

DETAILED DESCRIPTION OF THE PREFERRED EMBODIMENTS

The present invention will now be described in detail.

Component A means chromium carbide, B component means titanium carbo-nitride, component C meand $B_4C$. and component D means a metal boride selected from one or more of $TiB_2$, $CrB_2$, $TaB_2$, $MnB_2$, $MnB_2$, $VB_2$, $NbB_2$, $HfB_2$, $AlB_2$, $ZrB_2$, $TiB$, $CrB$, $TaB$, $CrB$, $TaB$, $MnB$, $MoB$, $VB$, $NbB$, $HfB$, $ZrB$ $W_2B_5$ and $Mo_2B_5$. The materials of the present invention include 1–90 wt% of component A and component B as the remainder.

(2) 1–90 wt% of component A, 0.1–5 wt% of component C and component B as the remainder.

(3) 1–90 wt% of component A and component B as the remainder, in which less than 95 wt% of component D is added.

(4) 1–90 wt% of component A, 0.1–5 wt% of component C and component B as the remainder of, in which less than 95 wt% of component D is added. There are compounds such as $Cr_3C_2$, $Cr_4C$ or $Cr_7C_3$ in chromium carbide used as componentA, these compounds can be used individually or in combinations of two or more groups. It is preferable that the mean grain size of chromium carbide powder is less than2 μm and less than 1 μm is much more preferable than 2 μm.

Titanium carbo-nitride in which the mole ratio of carbon and nitrogen is between 1:9 and 9:1 is used for component B, and it is hard to obtain ceramic materials of excellent toughness if the mol ratio is not within such range. Titanium carbo-nitride can be used individually or in combinations of two or more groups. It is preferable that the mean grain size of titanium carbo-nitride is less than 2 μm, and less than 1 μm is much more preferable than 2 μm. There are usuallythree kinds of mole ratios of carbon and nitrogen it titanium carbo-nitride on the market 0.7:0.3, 0.5:0.5 or 0.3:0.7.

The amount of chromium carbide as component A ranges at the range from 1 to 90 wt% per the total amount of the mixed powder in the ceramic materials of the present invention. It is hard to obtain ceramic materials having desired properties if the amount is less than 1 wt% or more than 90 wt%. Sintered ceramics in which the amount of chromium carbide is less than 50 wt% per the total amount.

The material of claim 4 in the present invention when adding $B_4C$ as component C to the above-mentioned ceramic materials, a fine powder as the raw powder is preferable with regard to $B_4C$, it is preferable that the mean grain size of $B_4C$ is less than 2 μm, and less than 1 μm is much more preferable than 2 μm. The addition of 0.1–5 wt% of $B_4C$ remarkably helps densification. However, addition of less than 0.1 wt% or more than 5 wt% make densification difficult and lowers hardness.

The present invention further includes adding metal boride as component D for the purpose of developing of the properties of the ceramic materials, and any combinations of the above-mentioned chemical materials can be selected for metal boride as component D. Metal boride powder can be used individually or combinations or two in more groups. It is preferable that the mean grain size of metal boride powder is less than 2 μm, and less than 1 μm is much more preferable than 2 μm.

The above-mentioned metal boride powder is used in the proportion of less than 95 wt% per the total amount of the material. An excellent ceramic material of high strength, high density and high hardness of especially obtained where the mixing amount is between 20–70 wt%. Also, metal borides useful especially for industrial purposes are $TiB_2$, $ZrB_2$ and $CrB_2$.

Ceramic raw powder of the present invention is mixed using the above-mentioned components, and are produced by the same methods which are already known as the methods for producing ceramic materials.

For example, the raw powder mixture is packed in a metal mold, cold-pressed at a pressure of 0.5-10 ton/cm², further pressed at less than 0.5-10 ton/cm² by a coldisostatic press, and the compacted powder is sintered in a vacuum or a neutral or reducing atmosphere such as in argon under the condition of 1300°-1900° C., for 5-300 minutes.

According to another method, the raw powder mixture is packedin a graphite mold, sintered in a vacuum or a neutral or reducing atmosphere such as argon or hydrogen under a pressure of 50-300 Kg/cm² and a temperature of 1300°-2000° C. for 10-200 minutes. This method is known as hot pressing.

The present invention will be better understood through the following examples.

(EMBODIMENT 1)

Various proportions of $Cr_3C_2$ powder per the total amount was added to $Ti(C_{0.5}N_{0.5})$ powder, the mixed powder was pressed in a metal mold, and the pressed powder was further uniformlycompacted at a pressure of 3 ton/cm², using a cold isostatic press.

The pressed powder obtained in the above-mentioned process was sintered in a vacuum at 1850° C. for 90 minutes.

The obtained ceramic materials have high density, high strength and high hardness, and the results are shown in the following Table 1. The results when $Cr_3C_2$ powder is not added is also shown in Table 1.

(EMBODIMENT 2)

Ten(10) wt% and 20 wt% of $Cr_3C_2$ powder per the total amount was added to $Ti(C_{0.5}N_{0.5})$, the mixed powder was pressed in a metal mold, and the compacted powder was further uniformly pressed at a pressure of 3 ton/cm², using a cold isostatic press.

The compacted powder obtained in the above-mentioned process was sintered in a vacuum at 1500°-1800° C. for 90 minutes.

Dense ceramics devoid of porosity were obtained.

These properties are shown in the following Table 2.

TABLE 2

| | | | PROPERTIES OF SINTERED BODIES | | |
|---|---|---|---|---|---|
| No. | $Cr_3C_2$ CONTENTS (wt. % per the total amount) | SINTERING TEMPERATURE (°C.) | TRANSVERSE RUPTURE STRENGTH (Kg/mm²) | VICKERS HARDNESS Hv (Kg/mm²) | POROSITY |
| 9 | 10 | 1550 | 65 | — | NONE |
| 10 | | 1600 | 75 | 2000 | NONE |
| 11 | | 1700 | 60 | — | NONE |
| 12 | | 1800 | 40 | — | NONE |
| 13 | 20 | 1550 | 40 | — | NONE |
| 14 | | 1600 | 55 | — | NONE |
| 15 | | 1700 | 60 | — | NONE |
| 16 | | 1800 | 70 | 2200 | NONE |

(EMBODIMENT 3)

Ten(10) wt% of $Cr_3C_2$ powder per the total amount was added to titanium carbo-nitride powders in which the proportion of carbon and nitride was different in each, the mixed powder was pressed in a metal mold, and the compacted powder was further uniformly pressed at a pressure of 3 ton/cm², using a cold isostatic press.

The compacted powder obtained in the above-mentioned process was sintered in a vacuum at each temperature shown in Table 3 for 90 minutes.

Dense ceramic materials lacking porosity were obtained.

The final properties are shown in the following Table 3, and the results where titanium nitride and titanium carbide were used in placeof titanium carbo-nitride are also shown in Table 3 for comparison.

TABLE 1

| | | PROPERTIES OF SINTERED BODIES | | |
|---|---|---|---|---|
| No. | $CR_3C_2$ CONTENTS (wt. % per the total amount) | TRANSVERSE RUPTURE STRENGTH (Kg/mm²) | VICKERS HARDNESS Hv (Kg/mm²) | POROSITY |
| 1 | 0 | 35 | 1400 | A LARGE AMOUNT |
| 2 | 1 | 35 | 1500 | A LITTLE |
| 3 | 5 | 35 | 1600 | NONE |
| 4 | 10 | 35 | 1700 | NONE |
| 5 | 20 | 50 | 2200 | NONE |
| 6 | 30 | 60 | 2300 | NONE |
| 7 | 40 | 60 | 2300 | NONE |
| 8 | 90 | 35 | 1600 | NONE |

TABLE 3

| | | | PROPERTIES OF SINTERED COMPACTS | | |
|---|---|---|---|---|---|
| No. | TITANIUM COMPOUNDS | SINTERING TEMPERATURE (°C.) | TRANSVERSE RUPTURE STRENGTH (Kg/mm²) | VICKERS HARDNESS Hv (Kg/mm²) | POROSITY |
| 17 | TiN | 1800 | 50 | 1500 | NONE |

TABLE 3-continued

| No. | TITANIUM COMPOUNDS | SINTERING TEMPERATURE (°C.) | PROPERTIES OF SINTERED COMPACTS | | |
|---|---|---|---|---|---|
| | | | TRANSVERSE RUPTURE STRENGTH (Kg/mm$^2$) | VICKERS HARDNESS Hv (Kg/mm$^2$) | POROSITY |
| 18 | TiC$_{0.2}$N$_{0.8}$ | 1700 | 70 | 1800 | NONE |
| 19 | TiC$_{0.3}$N$_{0.7}$ | 1600 | 75 | 2000 | NONE |
| 20 | TiC$_{0.7}$N$_{0.3}$ | 1600 | 75 | 2300 | NONE |
| 21 | TiC$_{0.8}$N$_{0.2}$ | 1600 | 70 | 2300 | NONE |
| 22 | TiC | 1600 | 50 | 2300 | NONE |

(EMBODIMENT 4)

Differing proportions of Cr$_3$C$_2$ powder and TiB powder per the total amount were added to Ti(C$_{0.5}$N$_{0.5}$) powder, the mixed powder was pressed in a metal mold, and the pressed powder was further uniformly compacted. At a pressure of 3 ton/cm$^2$, using a cold isostatic press.

Dense ceramic materials lacking porosity were obtained.

The final properties are shown in the following Table 4, and No. 31 in Table 4 is a comparative embodiment.

TABLE 4

| No. | Cr$_3$C$_2$, TiB$_2$ CONTENTS (wt. % per the total amount) | | PROPERTIES OF SINTERED COMPACTS | | |
|---|---|---|---|---|---|
| | Cr$_3$C$_2$ | TiB$_2$ | TRANSVERSE RUPTURE STRENGTH (Kg/mm$^2$) | VICKERS HARDNESS Hv (Kg/mm$^2$) | POROSITY |
| 23 | 1 | 30 | 70 | 2000 | NONE |
| 24 | 5 | 30 | 70 | 2000 | NONE |
| 25 | 40 | 30 | 70 | 2200 | NONE |
| 26 | 50 | 30 | 70 | 2200 | NONE |
| 27 | 90 | 5 | 50 | 2000 | NONE |
| 28 | 30 | 5 | 70 | 2300 | NONE |
| 29 | 30 | 30 | 70 | — | NONE |
| 30 | 30 | 60 | 70 | — | NONE |
| 31* | 1 | 95 | 59 | — | EXIST |

(EMBODIMENT 5)

A mixed powder consisting of 10 wt% of Cr$_3$C$_2$ powder per the total amount and to Ti(C$_{0.5}$N$_{0.5}$) and a mixed powder consisting of 5 wt% of Cr$_3$C$_2$ powder per the total amount and 30 wt% of TiB$_2$ powder per the total amount were each packed in a graphite mold, pressed by a die press at 200 Kg/cm$^2$, and sintered at 1600° C. for the former and 1700° C. for the latter in a vacuum for 60 minutes.

The dense ceramic materials obtained die not have any porosity, and had high transverse rupture strength and high hardness.

The final properties are shown in the following Table 5.

TABLE 5

| No. | COMPOSITIONS OF THE RAW MATERIALS | SINTERING TEMPERATURE (°C.) | PROPERTIES OF SINTERED COMPACTS | | |
|---|---|---|---|---|---|
| | | | TRANSVERSE RUPTURE STRENGTH (Kg/mm$^2$) | VICKERS HARDNESS Hv (Kg/mm$^2$) | POROSITY |
| 32 | TiC$_{0.5}$N$_{0.5}$ + 10% Cr$_3$C$_2$ | 1600 | 100 | 2500 | NONE |
| 33 | TiC$_{0.5}$N$_{0.5}$ + 5% Cr$_3$C$_2$ + 30% TiB$_2$ | 1700 | 100 | 2500 | NONE |

(EMBODIMENT 6)

Mixed powders consisting of various proportions of Cr$_3$C$_2$, TiB$_2$ and B$_4$C powder per the total amount were with to TiC$_{0.5}$N$_{0.5}$, TiC and TiN powder as shown in Table 6, and the pressed powder bodies were obtained with a metal mold and a cold isostatic press. The compacted powder bodies were each sintered in a vacuum at each temperature shown in Table 6 for 90 minutes, and the results in transverse rupture strength, porosity and Vickers hardness for each ceramic sintered body obtained are shown in the following Table 6.

Even specimens No.34, No41, No.47 and No.50, in which B$_4$C is not added, show a lowering of the percentage of porosity by adding B$_4$C, sintered dense bodies are obtained, and transverse rupture strength and hardness become higher. However, too much B$_4$C lowers transverse rupture and hardness, and the percentage of porosity also increases by adding more than 5 wt% of B$_4$C. Therefore, adding of less than 5 wt% B C is most preferable.

TABLE 6

| No. | COMPOSITIONS (wt %) | SINTERING TEMPERATURE (°C.) | TRANSVERSE RUPTURE STRENGTH (Kg/mm$^2$) | POROSITY (%) | VICKERS HARDNESS (Hv)(Kg/mm$^2$) |
|---|---|---|---|---|---|
| 34* | TiC$_{0.5}$N$_{0.5}$—20Cr$_3$C$_2$ | 1700 | 60 | 4 | 2000 |
| 35 | TiC$_{0.5}$N$_{0.5}$—20Cr$_3$C$_2$—0.1B$_4$C | 1700 | 60 | 2 | 2000 |
| 36 | TiC$_{0.5}$N$_{0.5}$—20Cr$_3$C$_2$—1B$_4$C | 1700 | 65 | 0.1 | 2100 |
| 37 | TiC$_{0.5}$N$_{0.5}$—20Cr$_3$C$_2$—2B$_4$C | 1700 | 70 | 0.05 | 2200 |
| 38 | TiC$_{0.5}$N$_{0.5}$—20Cr$_3$C$_2$—3B$_4$C | 1700 | 65 | 0.5 | 2100 |
| 39 | TiC$_{0.5}$N$_{0.5}$—20Cr$_3$C$_2$—2B$_4$C | 1600 | 55 | 4 | — |
| 40 | TiC$_{0.5}$N$_{0.5}$—30Cr$_3$C$_2$—2B$_4$C | 1650 | 70 | 0.9 | — |
| 41* | TiC$_{0.5}$N$_{0.5}$—30Cr$_3$C$_2$—30TiB$_2$ | 1850 | 70 | 1.0 | 2300 |
| 42 | TiC$_{0.5}$N$_{0.5}$—30Cr$_3$C$_2$—30TiB$_2$—0.1B$_4$C | 1850 | 70 | 0.8 | 2400 |
| 43 | TiC$_{0.5}$N$_{0.5}$—30Cr$_3$C$_2$—30TiB$_2$—1B$_4$C | 1850 | 80 | 0.5 | 2400 |
| 44 | TiC$_{0.5}$N$_{0.5}$—30Cr$_3$C$_2$—30TiB$_2$—2B$_4$C | 1850 | 70 | 0.5 | 2400 |
| 45 | TiC$_{0.5}$N$_{0.5}$—30Cr$_3$C$_2$—30TiB$_2$—3B$_4$C | 1850 | 60 | 0.5 | 2400 |
| 46 | TiC$_{0.5}$N$_{0.5}$—30Cr$_3$C$_2$—30TiB$_2$—5B$_4$C | 1850 | 30 | 7 | 2000 |
| 47* | TiC—20Cr$_3$C$_2$ | 1700 | 60 | 3 | 2000 |
| 48 | TiC—20Cr$_3$C$_2$—2B$_4$C | 1700 | 70 | 0.05 | 2200 |
| 49 | TiC—20Cr$_3$C$_2$—30TiB$_2$—1B$_4$C | 1850 | 80 | 0.5 | 2400 |
| 50* | TiN—20Cr$_3$C$_2$ | 1700 | 50 | 3 | 1800 |
| 51 | TiN—20Cr$_3$C$_2$—2B$_4$C | 1700 | 70 | 0.05 | 2000 |
| 52 | TiN—30Cr$_3$C$_2$—30TiB$_2$—1B$_4$C | 1850 | 80 | 0.05 | 2200 |

*The materials in which B$_4$C is not added.

As described above, TiC, TiN and TiCN ceramic materials of high density, high hardness and high strength are obtained in the present invention, and are very good materials for cutting tools or wear-resistant materials.

Additionally, ceramic materials in the present invention have Cr$_2$O$_3$ on the surface by using at more than 600° C. in air, and the coefficient of friction becomes low. Therefore, ceremic materials in the present invention are also excellent material for sliding machine parts used at a high temperature range.

What we claim is:

1. A sintered ceramic material useful as a cutting tool or wear resistant machine part consisting of 1 to 90 weight% chromium carbide and 99 to 10 weight% titanium carbo-nitride, all weight percents being based on the total amount of sintered ceramic material, wherein the mole ratio of carbon to nitrogen in the titanium carbo-nitride ranges from 1:9 to 9:1.

2. A sintered ceramic material according to claim 1, wherein said chromium carbide is present in amounts ranging from 1 to 50 weight % and said titanium carbo-nitride is present in amounts ranging from 50 to 99 weight percent.

3. A sintered ceramic material according to claim 2, wherein the mole ratio of carbon to nitrogen in the titanium carbo-nitride is 5:5, 7:3, or 3:7.

4. A sintered ceramic material useful as a cutting tool or wear resistant machine part consisting of 1 to 90 weight % chromium carbide, 0.1 to 5 weight % B$_4$C, and titanium carbo-nitride as the remainder, all weight percents being based on the total amount of sintered ceramic material, wherein the mole ratio of carbon to nitrogen in the titanium carbo-nitride ranges from 1:9 to 9:1.

5. A sintered ceramic material according to claim 4, wherein said chromium carbide is present in amounts ranging from 1 to 50 weight % based on the total amount of sintered ceramic material.

6. A sintered ceramic material useful as a cutting tool or wear resistant machine part consisting of 1 to 90 weight % chromium carbide, less than 95 weight % metal boride selected from the group consisting of TiB$_2$, CrB$_2$, TaB$_2$, MnB$_2$, MoB$_2$, VB$_2$, NbB$_2$, HfB$_2$, AlB$_2$, ZrB$_2$, TiB, CrB, TaB, MnBl, VB, NbB, HfB, ZrB, W$_2$B$_5$, Mo$_2$B$_5$ and mixtures thereof, and titanium carbo-nitride as the remainder, wherein the mole ratio of carbon to nitrogen in the titanium carbo-nitride ranges from 1:9 to 9:1, all weight percents being based on the total amount of sintered ceramic material.

7. A sintered ceramic material according to claim 6, wherein said chromium carbide is present in amounts ranging from 1 to 50 weight % based on the total amount of sintered ceramic material.

8. A sintered ceramic material according to claim 17, wherein said metal boride is selected from the group consisting of TiB$_2$, ZrB$_2$, CrB$_2$ and mixtures thereof.

9. A sintered ceramic material useful as a cutting tool or wear resistant machine part consisting of 1 to 90 weight % chromium carbide, 0.1 to 5 weight % B$_4$C, less than 95 weight % metal boride selected from the group consisting of TiB$_2$, CrB$_2$, TaB$_2$, MnB$_2$, MoB$_2$, VB$_2$, NbB$_2$, HfB$_2$, AlB$_2$, ZrB, TiB, CrB, TaB, MnB, MoB, VB, NbB, HfB, ZrB, W$_2$B$_5$, Mo$_2$B$_5$ and mixtures thereof, and titanium carbo-nitride as the remainder, wherein the mole ratio of carbon to nitrogen in the titanium carbo-nitride ranges from 1:9 to 9:1, all weight percents being based on the total amount of sintered ceramic material.

10. A sintered ceramic material according to claim 9, wherein said chromium carbide is present in amounts ranging from 1 to 50 weight % based on the total amount of sintered ceramic material.

11. A sintered ceramic material according to claim 10, wherein said metal boride is selected from the group consisting of TiB$_2$, ZrB$_2$, CrB$_2$ and mixtures thereof.

12. A sintered ceramic material according to claim 1, wherein the chromium carbide and titanium carbo-nitride each have a mean grain size before sintering of less than 2 μm.

13. A sintered ceramic material according to claim 1, wherein the chromium carbide and titanium carbo-nitride each have a mean grain size before sintering of less than 1 μm.

14. A sintered ceramic material according to claim 4, wherein the chromium carbide, B$_4$C and titanium carbo-nitride each have a mean grain size before sintering of less than 2 μm.

15. A sintered ceramic material according to claim 4, wherein the chromium carbide, B$_4$C and titanium carbo-nitride each have a mean grain size before sintering of less than 1 μm.

16. A sintered ceramic material according to claim 5, wherein the mole ratio of carbon to nitrogen in the titanium carbo-nitride is 5:5, 7:3, or 3:7.

17. A sintered ceramic material according to claim 6, wherein said metal boride is $TiB_2$.

18. A sintered ceramic material according to claim 6, wherein the metal boride is present in amounts ranging from 20 to 70 weight% based on the total amount of sintered ceramic material.

19. A sintered ceramic material according to claim 6, wherein the chromium carbide, metal boride and titanium carbo-nitride each have a mean grain size before sintering of less than 2 μm.

20. A sintered ceramic material according to claim 6, wherein the chromium carbide, metal boride and titanium carbo-nitride each have a mean grain size before sintering of less than 1 μm.

21. A sintered ceramic material according to claim 7, wherein the mole ratio of carbon to nitrogen in the titanium carbo-nitride is 5:5, 7:3, or 3:7.

22. A sintered ceramic material according to claim 9, wherein said metal boride is $TiB_2$.

23. A sintered ceramic material according to claim 10, wherein the mole ratio of carbon to nitrogen in the titanium carbo-nitride is 5:5, 7:3, or 3:7.

24. A sintered ceramic material according to claim 9, wherein the metal boride is present in amounts ranging from 20 to 70 weight% based on the total amount of sintered ceramic material.

25. A sintered ceramic material according to claim 9, wherein the chromium carbide, $B_4C$, metal boride and titanium carbo-nitride each have a mean grain size before sintering of less than 2 μm.

26. A sintered ceramic material according to claim 9, wherein the chromium carbide, $B_4C$, metal boride and titanium carbo-nitride each have a mean grain size before sintering of less than 1 μm.

* * * * *